US012756283B2

(12) United States Patent
Chen et al.

(10) Patent No.: US 12,756,283 B2
(45) Date of Patent: Oct. 6, 2026

(54) MOTOR ROTOR, SELF-STARTING SYNCHRONOUS RELUCTANCE MOTOR COMPRISING SAME, AND COMPRESSOR

(71) Applicant: GREE ELECTRIC APPLIANCES, INC. OF ZHUHAI, Zhuhai (CN)

(72) Inventors: Bin Chen, Zhuhai (CN); Yong Xiao, Zhuhai (CN); Yusheng Hu, Zhuhai (CN); Xia Li, Zhuhai (CN); Jinfei Shi, Zhuhai (CN); Ying Li, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 155 days.

(21) Appl. No.: 18/780,265

(22) Filed: Jul. 22, 2024

(65) Prior Publication Data

US 2024/0380294 A1 Nov. 14, 2024

Related U.S. Application Data

(63) Continuation of application No. PCT/CN2022/127961, filed on Oct. 27, 2022.

(30) Foreign Application Priority Data

Jan. 26, 2022 (CN) ......................... 202210092227.8

(51) Int. Cl.
*H02K 19/14* (2006.01)
*H02K 1/24* (2006.01)
*H02K 19/10* (2006.01)

(52) U.S. Cl.
CPC ............. *H02K 19/14* (2013.01); *H02K 1/246* (2013.01); *H02K 19/103* (2013.01); *H02K 2213/03* (2013.01)

(58) Field of Classification Search
CPC ........ H02K 19/14; H02K 19/02; H02K 19/00; H02K 1/246; H02K 1/24; H02K 19/103; H02K 19/10; H02K 2213/03
See application file for complete search history.

(56) References Cited

FOREIGN PATENT DOCUMENTS

| | | | |
|---|---|---|---|
| CN | 108711967 | A | 10/2018 |
| CN | 208479298 | U | 2/2019 |

(Continued)

OTHER PUBLICATIONS

Machine Translation of CN 113726045 A (Year: 2021).*
Text Version of EP 3923450 A1 (Year: 2021).*
Machine Translation of CN 112968556 A (Year: 2021).*
Machine Translation of CN 112701818 A (Year: 2021).*
Machine Translation of CN 113964972 A (Year: 2022).*

(Continued)

*Primary Examiner* — Alexander A Singh
*Assistant Examiner* — Charlie Frank Mann, Jr.
(74) *Attorney, Agent, or Firm* — Christensen O'Connor Johnson Kindness PLLC

(57) ABSTRACT

A motor rotor, a self-starting synchronous reluctance motor including the same, and a compressor. The motor rotor includes a rotor core, and the rotor core includes a first rotor lamination, an end ring, and a second rotor lamination. Filling slots, rotor slots, and a shaft hole are formed in the first rotor lamination. The filling slots include first filling slots and two second filling slots. The second rotor lamination is arranged between the end ring and the first rotor lamination. Through slots are formed in the second rotor lamination at positions corresponding to the filling slots of the first rotor lamination respectively. A total cross-sectional area of first portions of the rotor slots on the first rotor lamination between an edge of an inner hole and an outer circle of the second rotor lamination is less than a total cross-sectional area of the rotor slots on the first rotor lamination.

19 Claims, 8 Drawing Sheets

(56) References Cited

FOREIGN PATENT DOCUMENTS

| | | | | | |
|---|---|---|---|---|---|
| CN | 110138115 | A | | 8/2019 | |
| CN | 112653265 | A | | 4/2021 | |
| CN | 112701818 | A | * | 4/2021 | ............... H02K 1/24 |
| CN | 112968549 | A | | 6/2021 | |
| CN | 112968550 | A | | 6/2021 | |
| CN | 112968556 | A | * | 6/2021 | ............. H02K 21/02 |
| CN | 113726045 | A | * | 11/2021 | ............. H02K 19/02 |
| CN | 112701818 | B | | 12/2021 | |
| CN | 113964972 | A | * | 1/2022 | ............... H02K 1/22 |
| CN | 114520551 | A | | 5/2022 | |
| CN | 216819526 | U | | 6/2022 | |
| EP | 2146161 | B1 | | 3/2017 | |
| EP | 3923450 | A1 | * | 12/2021 | ............. H02K 19/14 |
| JP | H0865933 | A | | 3/1996 | |

OTHER PUBLICATIONS

International Search Report and Written Opinion mailed Jan. 3, 2023, issued in corresponding International Application No. PCT/CN2022/127961, filed Oct. 27, 2022, 11 pages.

Extended European Search Report mailed Jul. 28, 2025, issued in corresponding European Application No. EP 22923355, filed Oct. 27, 2022, 144 pages.

European Office Action mailed Mar. 18, 2026, issued in corresponding European Application No. EP 22923355.6, filed Oct. 27, 2022, 145 pages.

Bukhari, Syed Abid Ali Shah et al., "Development of a Direct Drive Synchronous Reluctance Motor with a Surrogate-Assisted Optimization Technique", 2019 IEEE Conference On Power Electronics and Renewable Energy (CPERE), IEEE, Oct. 23, 2019, pp. 319-326.

* cited by examiner

MOTOR ROTOR, SELF-STARTING SYNCHRONOUS RELUCTANCE MOTOR COMPRISING SAME, AND COMPRESSOR

CROSS-REFERENCE TO RELATED APPLICATIONS

The present application is a continuation application of PCT Patent Application No. PCT/CN2022/127961, filed on Oct. 27, 2022, which claims the priority of the Chinese patent application No. 202210092227.8, filed with China National Intellectual Property Administration on Jan. 26, 2022 and entitled "MOTOR ROTOR, SELF-STARTING SYNCHRONOUS RELUCTANCE MOTOR COMPRISING SAME, AND COMPRESSOR", the entire content of which is incorporated herein by reference.

TECHNICAL FIELD

The present invention relates to the technical field of motor design, and in particular to a motor rotor, a self-starting synchronous reluctance motor including the same, and a compressor.

BACK'GROUND

A self-starting synchronous reluctance motor combines the advantages of an asynchronous motor on the basis of a synchronous reluctance motor, and realizes a self-starting through an asynchronous torque generated by a rotor bar, without being driven by a frequency converter. Compared with the asynchronous motor, the motor can achieve an operation at a constant speed, low rotor loss, and improved efficiency during a synchronous operation. Compared with the asynchronous starting permanent magnet synchronous motor, such motor needs no permanent magnet materials, resulting in a low cost, and does not have a problem of permanent magnet demagnetization. However, the self-starting synchronous reluctance motor has difficulty in heat dissipation due to a structure of multiple magnetic barrier layers thereof.

SUMMARY

Therefore, the present invention provides a motor rotor, a self-starting synchronous reluctance motor comprising the same, and a compressor, which can overcome difficulty in heat dissipation of a self-starting synchronous reluctance motor in the related art due to a structure of multiple magnetic barrier layers thereof.

In order to solve the above problem, the present invention provides a motor rotor, including a rotor core. The rotor core includes: a first rotor lamination, an end ring, and a second rotor lamination. Filling slots, rotor slots, and a shaft hole are formed in the first rotor lamination. The filling slots include first filling slots and second filling slots. Two outer filling layers are respectively arranged on the first rotor lamination and proximate to a rotor outer circle along a q-axis, and each of the two outer filling layers includes one first filling slot. Multiple magnetic barrier layers are arranged between the two outer filling layers along the q-axis at intervals, and each of the multiple magnetic barrier layers includes one rotor slot, and two second filling slots arranged at two ends of the rotor slot, respectively. In the same magnetic barrier layer, separating ribs are arranged between the rotor slot and each of the two second filling slots. The second rotor lamination is arranged between the end ring and the first rotor lamination. Through slots are formed in the second rotor lamination at positions corresponding to the filling slots of the first rotor lamination respectively, and a total cross-sectional area of first portions of the rotor slots on the first rotor lamination between an edge of an inner hole and an outer circle of the second rotor lamination is less than a total cross-sectional area of the rotor slots on the first rotor lamination.

In some embodiments, a total cross-sectional area of second portions of the rotor slots on the first rotor lamination within the inner hole of the second rotor lamination is at least 30% of the total cross-sectional area of the rotor slots. And/Or the maximum width of an outer contour of the second rotor lamination is not greater than a diameter of an outer circle of the first rotor lamination. And/Or the maximum q-axial width of the inner hole of the second rotor lamination is not less than the maximum d-axial width thereof.

In some embodiments, lengths of at least two lines, among lines connecting a center of the rotor core and any points located at different positions on the edge of the inner hole of the second rotor lamination, are unequal.

In some embodiments, a ratio of the maximum q-axial width of the inner hole of the second rotor lamination to the maximum d-axial width thereof is from 1 to 1.5.

In some embodiments, a rotation-axial thickness of the second rotor lamination is not less than a thickness of a single-piece first rotor lamination.

In some embodiments, a total cross-sectional area of the through slots on the second rotor lamination is not greater than a total cross-sectional area of the filling slots arranged on the first rotor lamination.

In some embodiments, the through slots are formed in the second rotor lamination at the positions corresponding to the filling slots of the first rotor lamination respectively, and at the same position, a cross-sectional area of a single through slot on the second rotor lamination is not greater than a cross-sectional area of a single filling slot on the first rotor lamination.

In some embodiments, a d-axial width between the inner hole of the second rotor lamination and each of the through slots is greater than a width of a corresponding separating rib between a corresponding second filling slot and a corresponding rotor slot.

In some embodiments, radial widths at different positions, each of which is between the edge of the inner hole and the outer circle of the second rotor lamination, are unequal, and a radial width kd1 of the second rotor lamination on a d-axis and a radial width kq1 of the second rotor lamination on the q-axis satisfy $1.1 \leq kd1/kq1 \leq 2.8$.

In some embodiments, a total cross-sectional area of the second portions of the rotor slots 6 on the first rotor lamination within the inner hole of the second rotor lamination is at least 20% of a total circulation area of the motor.

In some embodiments, from the shaft hole of the rotor to the rotor outer circle, cross-sectional areas of the second portions of the rotor slots in the magnetic barrier layers on the first rotor lamination, each of which is within the inner hole of the second rotor lamination, progressively decrease.

In some embodiments, the maximum width of an outer contour of the end ring is not greater than the maximum width of an outer contour of the second rotor lamination, and the maximum distance from the center of the rotor core to an end face of the end ring is not less than the maximum distance from the center of the rotor core to an end face of the second rotor lamination.

In some embodiments, a d-axial radial width between an edge of an inner hole and an outer circle of the end ring is k9, and a q-axial radial width therebetween is k10, and it is satisfied that $1.1 \leq k9/k10 \leq 2.8$.

In some embodiments, a rotation-axial plane, where a side of each separating rib adjacent to the rotor outer circle is located, has a center point; L denotes a d-axial distance between two center points corresponding to two separating ribs located in any two adjacent magnetic barrier layers respectively, and W denotes the maximum q-axial dimension of a magnetic channel formed between filling slots in the any two adjacent magnetic barrier layers, and it is satisfied that $0 \leq L < 2W$.

In some embodiments, in a first quadrant formed by a d-axis and the q-axis, a distance from a center of a separating rib to the d-axis and a distance from the center of the separating rib to the q-axis satisfy $kq = -v \times kd + \lambda$, where: kq denotes the distance from the center of the separating rib to the q-axis, and kd denotes the distance from the center of the separating rib to the d-axis, and it is satisfied that $0.28 \leq v \leq 0.46$, and $28 \leq \lambda \leq 33$.

In some embodiments, in a direction from the shaft hole to the rotor outer circle along the q-axis, q-axial widths of the rotor slots of at least three layers decrease continuously.

In some embodiments, W1 denotes the minimum width of a magnetic channel between two adjacent filling slots, d denotes the minimum width of a magnetic channel formed between rotor slots located in the two magnetic barrier layers respectively, and it is satisfied that $W1 \geq d$.

In some embodiments, the minimum q-axial dimension h1 of a magnetic channel between two adjacent magnetic barrier layers satisfies $h1 \geq 1.5h2$, where h2 denotes the minimum q-axial width of one magnetic barrier layer having a relatively small q-axial width among the two adjacent magnetic barrier layers.

In some embodiments, magnetic channels each are formed between two adjacent magnetic barrier layers, and in a direction from the shaft hole to the rotor outer circle along the q-axis, q-axial widths of the magnetic channels decrease progressively.

In some embodiments, in the direction from the shaft hole to the rotor outer circle along the q-axis, the q-axial widths of at least three layers of magnetic channels decrease continuously. And/Or, magnetic channels each are formed between two adjacent magnetic barrier layers, and for a magnetic channel consisting of curved segments and straight segments, in directions from the q-axis to two sides of the q-axis respectively, widths of the magnetic channel progressively increase.

In some embodiments, in each magnetic barrier layer, a ratio of a width of the rotor slot at a position of the q-axis to a width of an end of the rotor slot adjacent to a corresponding filling slot is $\tau 1$, and from the innermost magnetic barrier layer to the outermost magnetic barrier layer, the ratios $\tau 1$ progressively increase.

In some embodiments, in each magnetic barrier layer, a ratio of the maximum q-axial width of each filling slot to a q-axial width of the rotor slot is $\tau 2$, and $\tau 2 > 1.4$.

In some embodiments, in an outer magnetic barrier layer close to the rotor outer circle along the q-axis, k3 denotes a d-axial width between ends of the two second filling slots proximate to two ends of the rotor slot respectively; in an adjacent inner magnetic barrier layer proximate to the shaft hole, K4 denotes a d-axial width between ends of the two second filling slots proximate to two ends of the rotor slot respectively; and it is satisfied that $0.5 \leq k3/k4 \leq 1$, or $0.5 \leq k4/k3 \leq 1$.

In some embodiments, in the outermost magnetic barrier layer close to the rotor outer circle along the q-axis, k5 denotes a d-axial width between ends of the two second filling slots proximate to two ends of the rotor slot 6 respectively; in an innermost magnetic barrier layer adjacent to the shaft hole, k6 denotes a d-axial width between ends of the two second filling slots proximate to two ends of the rotor slot respectively; and it is satisfied that $0.5 \leq k5/k6 \leq 1$, or $0.5 \leq k6/k5 \leq 1$.

In some embodiments, each of the first filling slots is arranged on a periphery of the rotor along the q-axis direction, has a segmented structure, and includes a plurality of q-axis filling slots; and a rib is provided between two adjacent q-axis filling slots.

In some embodiments, the number of ribs in each of the first filling slots is y, and y satisfies $1 \leq y \leq 4$.

In some embodiments, a d-axial width of the rib between any two adjacent q-axis filling slots is L3, and it is satisfied that $L3 > 0.1M1$, $L3 > 0.1M2$, and $L3 > 0.05(M1+M2)$, where M1 and M2 denote maximum d-axial widths of any two adjacent q-axis filling slots, respectively.

In some embodiments, a sum of d-axial widths of the ribs each located between two adjacent q-axis filling slots is $\Sigma L3$, and it is satisfied that $\Sigma L3 > 0.1\Sigma(M1+M2)$, where $\Sigma(M1+M2)$ denotes a sum of the maximum q-axial widths of the two adjacent q-axis filling slots.

In some embodiments, a difference between cross-sectional areas of the q-axis filling slots is within ±30%.

In some embodiments, an angle formed between straight lines connecting the center of the rotor and two ends of each of the first filling slots respectively is $\alpha 1$, and $20° \leq \alpha 1 \leq 60°$.

In some embodiments, an extending direction of each of the filling slots is approximately parallel to a d-axis with an angle deviation of no more than 5%.

In some embodiments, a d-axial width of each of the first filling slots is smaller than a d-axial width between ends of the two second filling slots in an adjacent magnetic barrier layer thereof, where the ends of the two second filling slots each are close to the rotor slot.

In some embodiments, a ratio of a q-axial distance k12 from the center of the rotor to an inner wall of the first filling slot to a radius Rr of the rotor satisfies $0.82 \leq k12/Rr \leq 0.96$. And/Or a ratio of a q-axial distance between respective sides, proximate to the shaft hole, of two innermost magnetic barrier layers adjacent to the shaft hole, to a q-axial width of a rotation shaft is greater than 1.2.

In some embodiments, a ratio of a diameter of a curved segment of a side, proximate to the shaft hole, of the innermost magnetic barrier layer adjacent to the shaft hole, to a q-axial width of a rotation shaft is greater than 2.

In some embodiments, the maximum q-axial thickness of each of the first filling slots is k, and the maximum q-axial thickness of the second filling slot in an adjacent magnetic barrier layer of the first filling slot is k1, and the minimum q-axial thickness of a magnetic channel connected to the each of the first filling slot is k2, and it is satisfied that $1 < k/k1 \leq 2$, and $0.8 < k/k2 \leq 1.6$.

In some embodiments, the maximum q-axial width of an end portion of each of the filling slots adjacent to the rotor outer circle is not greater than the maximum q-axial width of a region of the each of the filling slots adjacent to the q-axis of the rotor.

In some embodiments, q-axial widths of each of the filling slots from the rotor outer circle to the q-axis of the rotor are approximately equal, and a width deviation is not greater than 5%.

In some embodiments, among the filling slots on the first rotor lamination, at least five or more of the filling slots have different cross-sectional areas. And/Or a total cross-sectional area of the first filling slots and of the second filling slots is 30% to 70% of a total cross-sectional area of the first filling slots, of the second filling slots, and of the rotor slots.

In some embodiments, a ratio of the maximum q-axial width to the minimum q-axial width of each of the filling slots is $\tau$, and $1\leq\tau\leq2$.

In some embodiments, $1.3\leq\tau\leq1.5$.

In some embodiments, in a direction from the rotor outer circle to the shaft hole along the q-axis, d-axial widths of the second filling slots increase progressively.

In some embodiments, in the direction from the rotor outer circle to the shaft hole along the q-axis, maximum d-axial widths of second filling slots in at least three layers increase continuously.

In some embodiments, in the direction from the shaft hole to the rotor outer circle along the q-axis, maximum d-axial widths of second filling slots, which are disposed in the magnetic barrier layers from a second magnetic barrier layer to an outermost magnetic barrier layer close to the rotor outer circle, decrease continuously.

In some embodiments, at least part of the filling slots among the first filling slots and the second filling slots are filled with conductive but non-magnetic material, and the filling slots are self-short-circuited through end rings arranged at two ends of the second rotor lamination respectively to form a squirrel-cage structure.

In some embodiments, each of the rotor slot includes a curved segment and/or a straight segment; curvature radii of curved segments of the rotor slots become larger progressively in a direction from the shaft hole to the rotor outer circle; in the same layer, a curvature radius of an outer arc of the rotor slot is greater than a curvature radius of an inner arc of the rotor slot; and the curved segment protrudes in the direction from the shaft hole to the rotor outer circle. Or two ends of each of the rotor slots extend in a d-axis direction to form straight segments respectively, two ends of each of or part of the rotor slots are parallel to a d-axis, and widths of each of the rotor slots progressively increase from the middle of the rotor slot toward two ends thereof.

In some embodiments, in a direction from the shaft hole to the rotor outer circle, lengths of curves, each of which is connected between ends of the rotor slot adjacent to the two second filling slots in each layer, decrease progressively, and the lengths of the curves of adjacent rotor slots decrease by a ratio from 5% to 25%. And/Or the maximum q-axial width of the shaft hole is not greater than the maximum d-axial width of the shaft hole.

The present invention further provides a self-starting synchronous reluctance motor, including a stator and the motor rotor above.

In some embodiments, a rotation-axial plane, where a side of each separating rib adjacent to the rotor outer circle is located, has a center point; L denotes a d-axial distance between two center points corresponding to two separating ribs located in any two adjacent magnetic barrier layers respectively, and $\sigma$ denotes a width of an air gap formed between an inner wall of an inner circle of the stator and the rotor outer circle, and it is satisfied that $0\leq L<8\sigma$.

In some embodiments, L1 denotes a d-axial width of a separating rib in the outermost magnetic barrier layer proximate to the rotor outer circle along the q-axis, and L2 denotes a d-axial width of a separating rib in the innermost magnetic barrier layer adjacent to the shaft hole, and L1 is not less than L2, and $L1\geq0.5\sigma$, where $\sigma$ denotes a width of an air gap between an inner wall of an inner circle of the stator and the rotor outer circle.

In some embodiments, each of the first filling slots is arranged on a periphery of the rotor along a q-axis direction, has a segmented structure, and includes a plurality of q-axis filling slots; a rib is provided between two adjacent q-axis filling slots. A difference between widths of the ribs is within ±20%, the minimum value L3 of the widths of the ribs satisfy $L3\geq\sigma$, where $\sigma$ denotes a width of an air gap between an inner wall of an inner circle of the stator and the rotor outer circle.

In some embodiments, a spacing between the rotor outer circle and a filling slot of the innermost magnetic barrier layer proximate to the shaft hole along the q-axis is h3, and a spacing between the rotor outer circle and an outer filling layer adjacent to the rotor outer circle is h4, and it is satisfied that $h4\geq h3$, and $0\leq h3\leq2.5\sigma$, where $\sigma$ denotes a width of an air gap between an inner wall of an inner circle of the stator and the rotor outer circle.

The present invention further provides a compressor, including the self-starting synchronous reluctance motor above.

The motor rotor, the self-starting synchronous reluctance motor including the motor rotor, and the compressor provided in the present invention can ensure that at least some portions of the rotor slots can be in a direct contact with the air to form a circulation hole, thereby increasing the heat dissipation of the rotor.

Reference signs are as follows:

2. second rotor lamination; 21. through slot; 3. end ring; 4. first rotor lamination; 51. first filling slot; 511. q-axis filling slot; 52. second filling slot; 6. rotor slot; 7. shaft hole; 8. separating rib; 9. rib.

DETAILED DESCRIPTION OF THE EMBODIMENTS

Referring to FIGS. 1 to 8, according to an embodiment of the present invention, the present invention provides a motor rotor of a self-starting synchronous reluctance motor. The motor rotor can increase an area of the rotor directly contacting the air, form circulation slots, and increase heat dissipation of the rotor through a special design of a rotor core.

Figure 1:
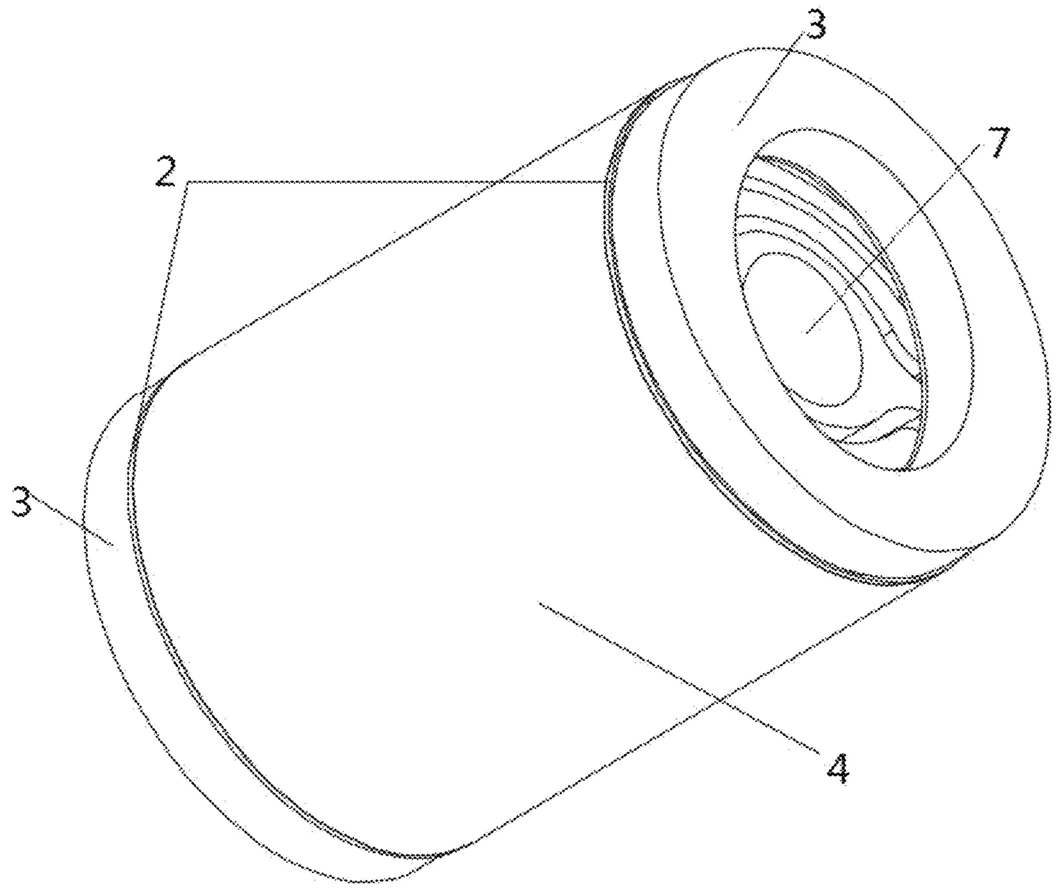
FIG. 1 is a schematic view showing a three-dimensional structure of a motor rotor according to an embodiment of the present invention.
Figure 2:
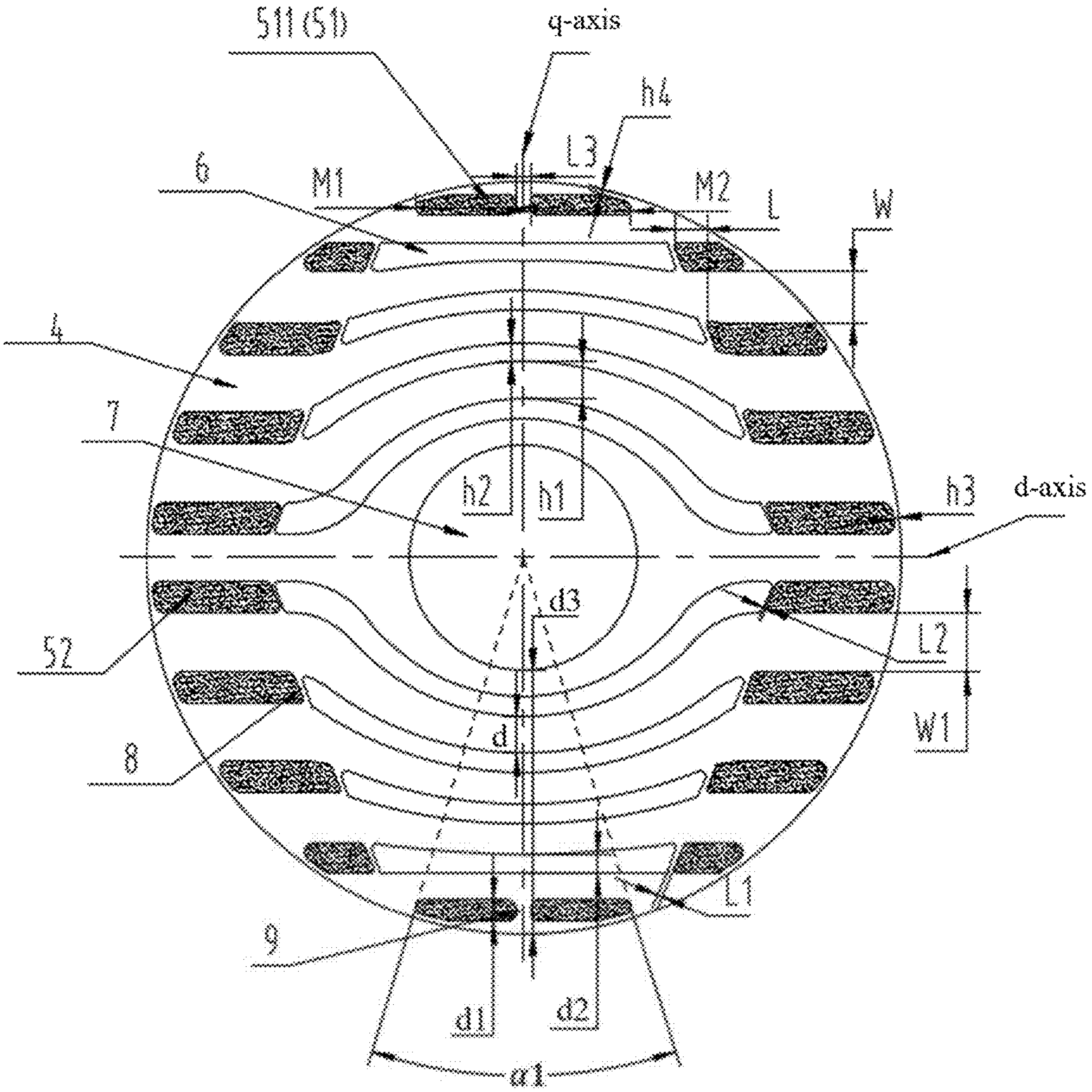
FIG. 2 is a schematic view showing an axial structure of a first rotor lamination of the motor rotor according to an embodiment of the present invention.
Figure 3:
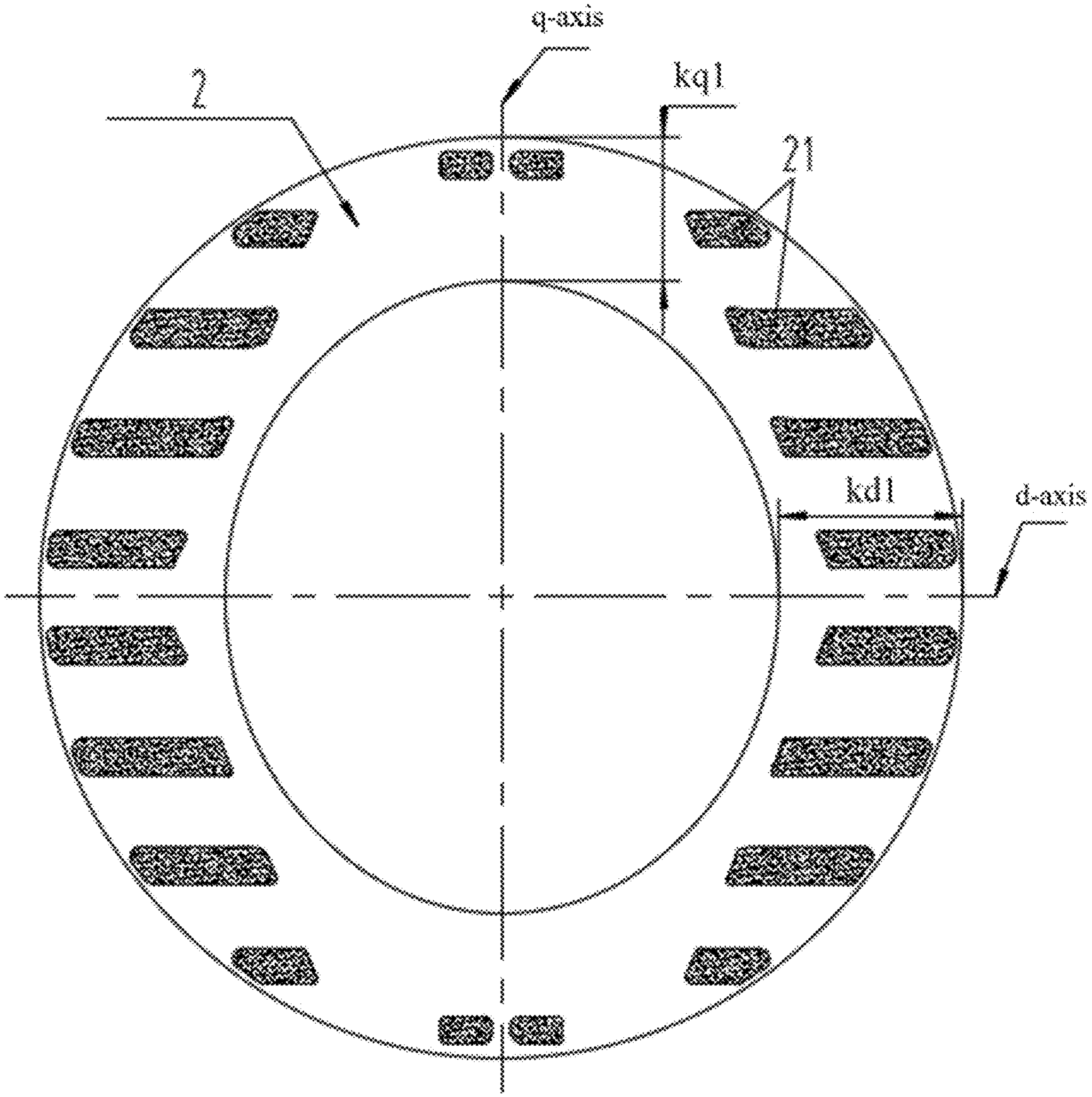
FIG. 3 is a schematic view showing an axial structure of a second rotor lamination of the motor rotor according to an embodiment of the present invention.
Figure 4:
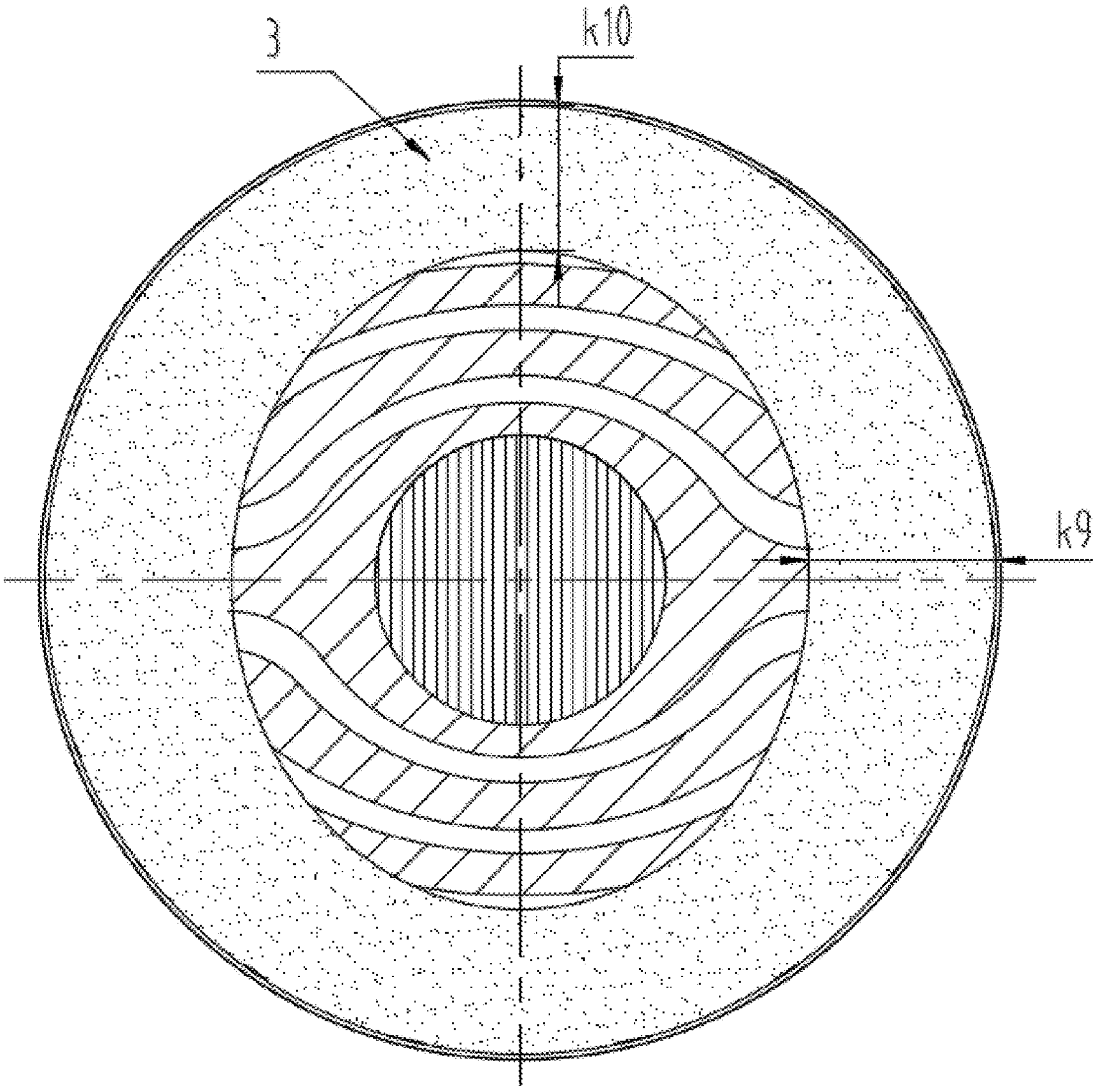
FIG. 4 is a schematic view showing an axial structure of the motor rotor according to an embodiment of the present invention.
Figure 5:
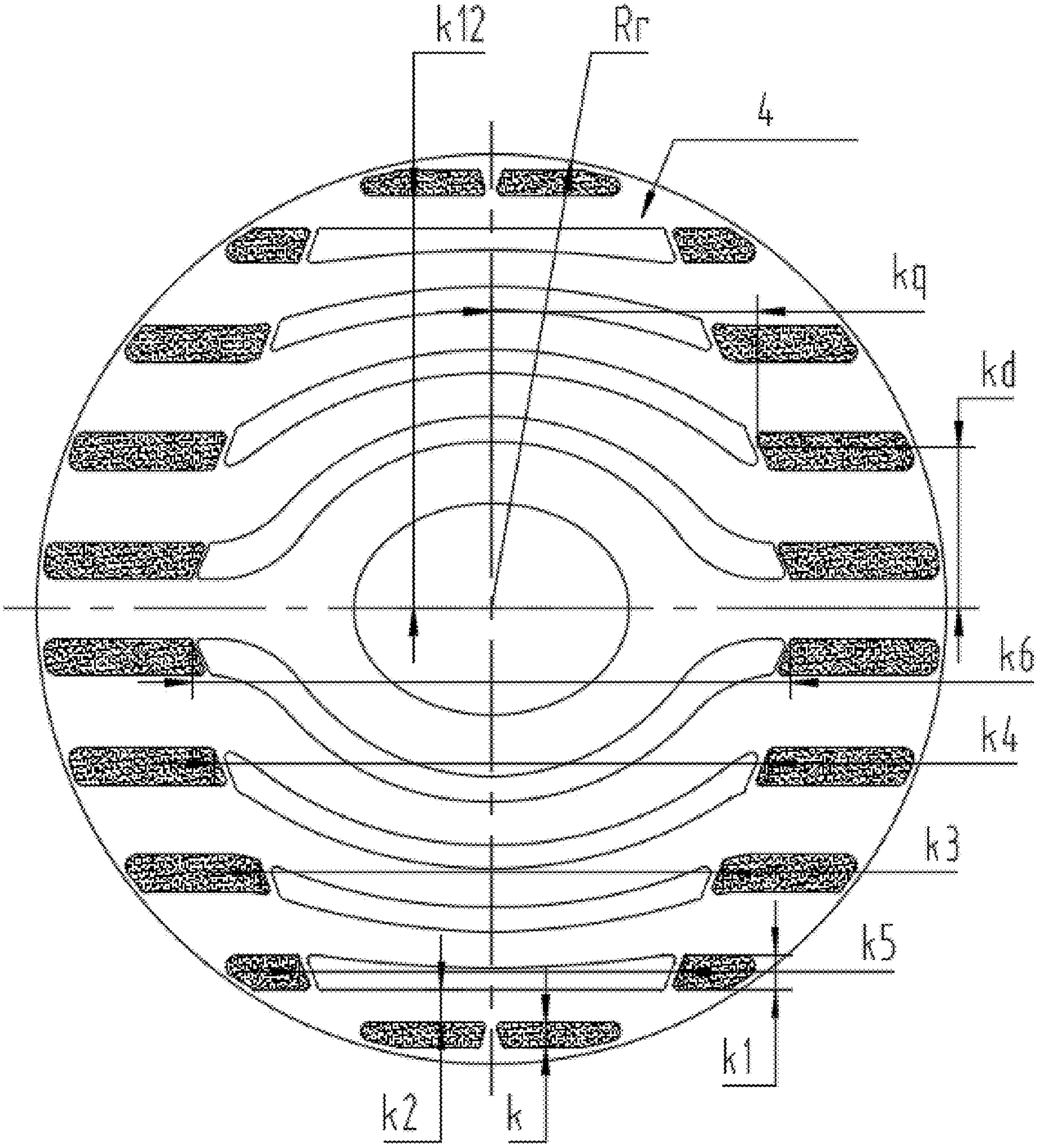
FIG. 5 is a schematic view showing an axial structure of the first rotor lamination of the motor rotor according to another embodiment of the present invention.
Figure 6:
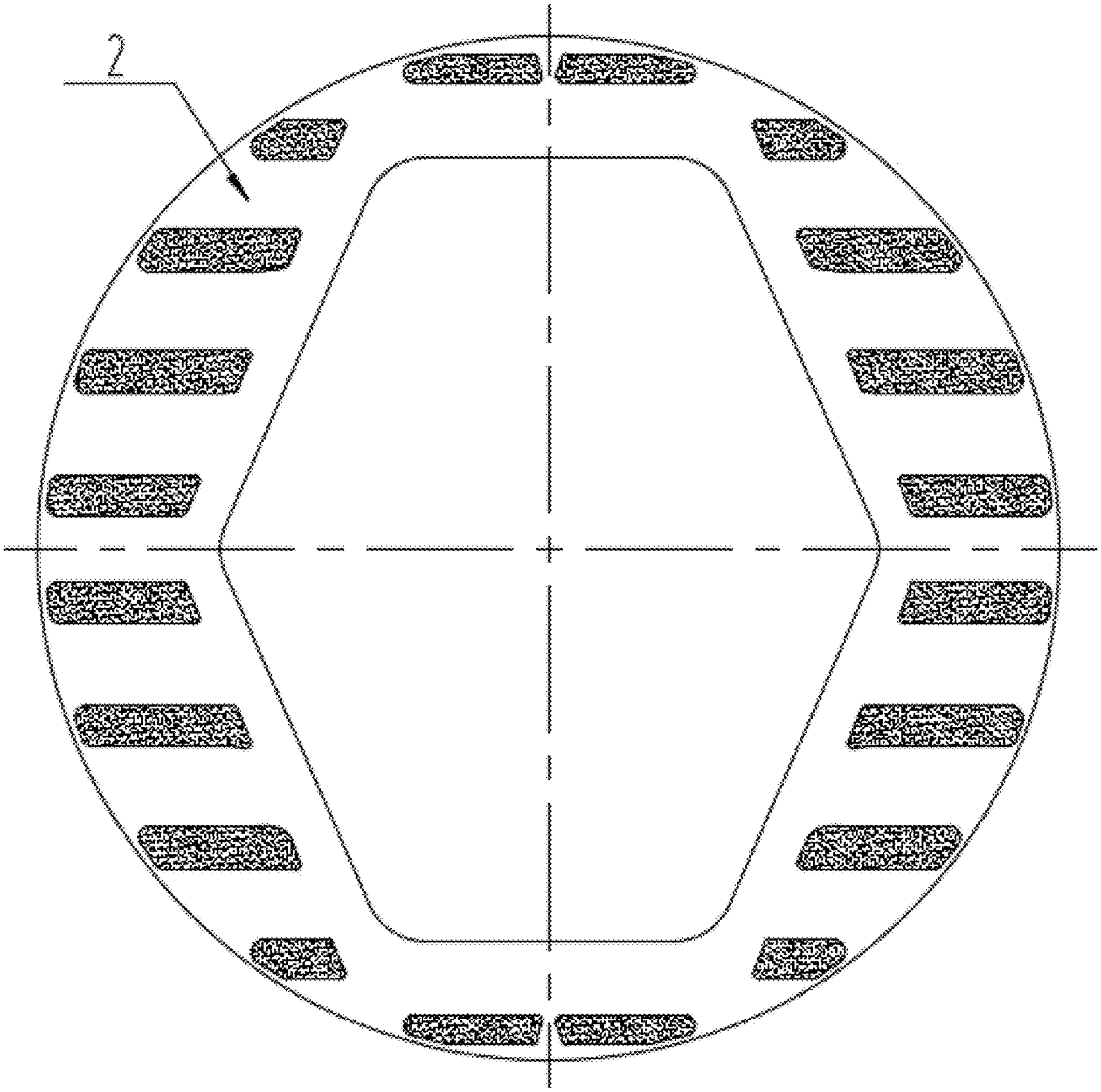
FIG. 6 is a schematic view showing an axial structure of the second rotor lamination of the motor rotor according to another embodiment of the present invention.
Figure 7:
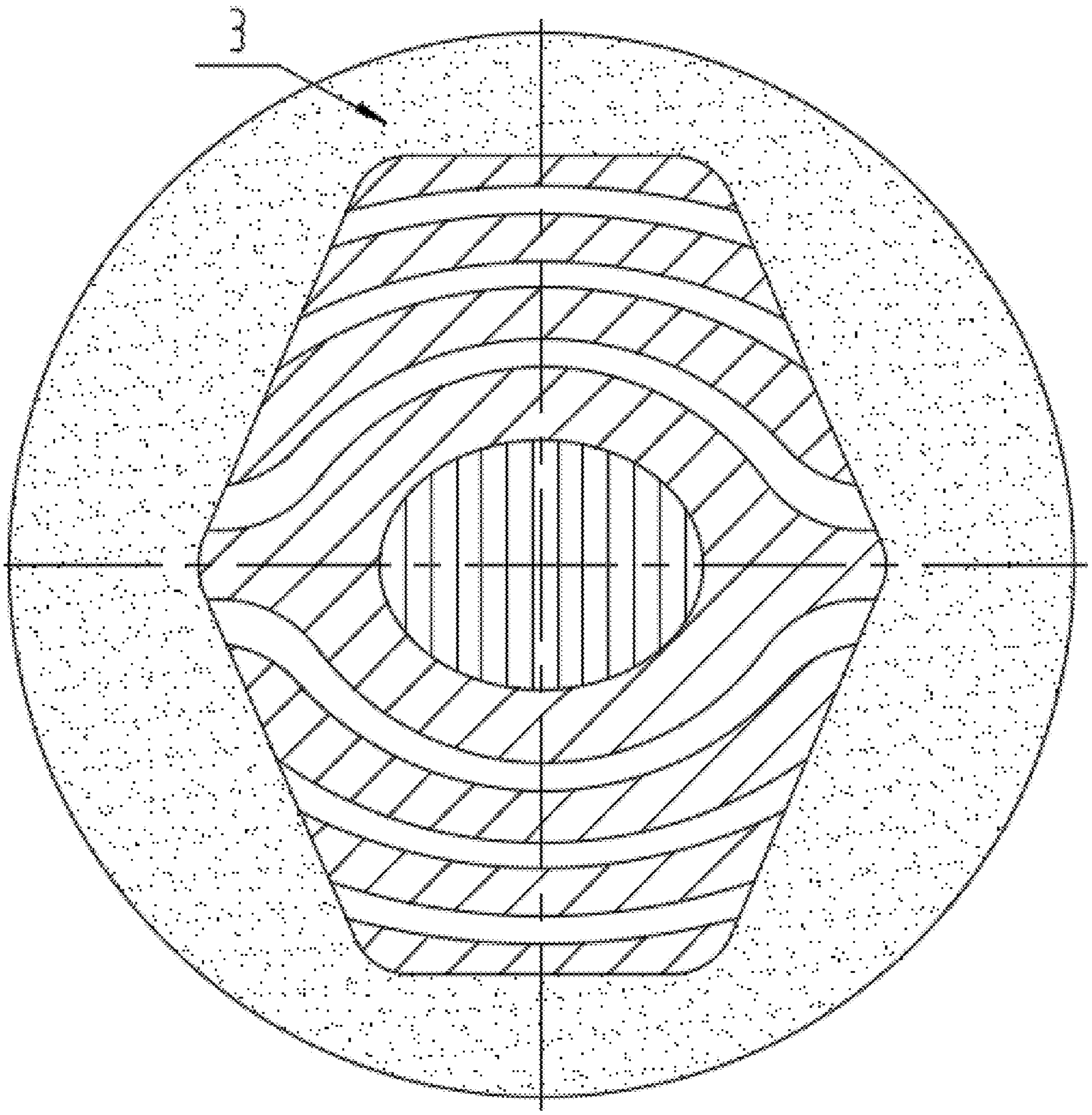
FIG. 7 is a schematic view showing an axial structure of the motor rotor according to another embodiment of the present invention.
Figure 8:
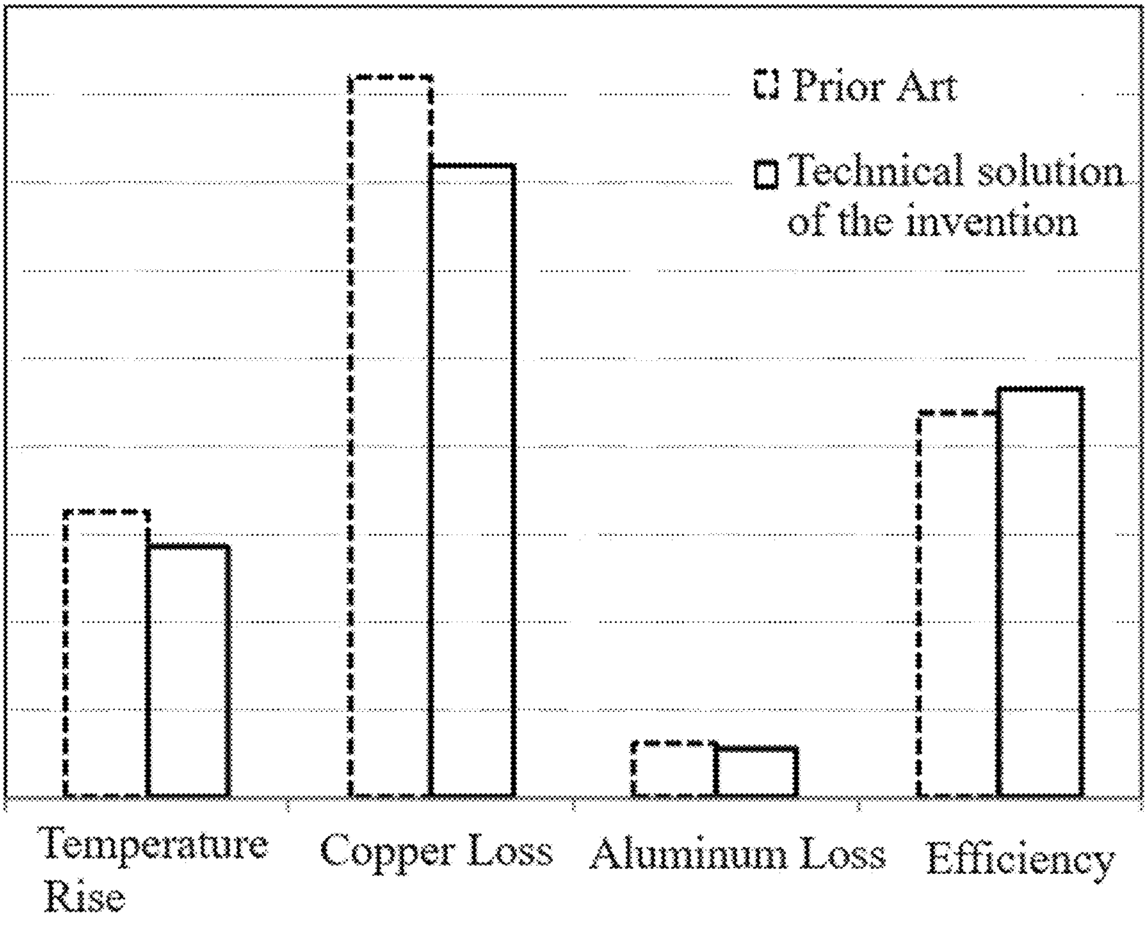
FIG. 8 is a diagram showing comparisons between temperature rises, losses and efficiencies of a motor using a technical solution of the present invention and a motor in the prior art.

The specific implementations of the rotor are described herein in conjunction with the embodiments of the attached drawings. FIG. 1 is a schematic view of a motor rotor. The motor rotor includes a rotor core, and the rotor core includes a first rotor lamination 4, a second rotor lamination 2, and end rings 3. In some embodiments of the present application, as shown in FIG. 2, filling slots, rotor slots 6, and a shaft hole 7 are formed in the first rotor lamination 4. The filling slots include first filling slots 51 and second filling slots 52. Two outer filling layers are arranged on the first rotor lamination 4 along a q-axis and are proximate to the rotor outer circle respectively, and each outer filling layer includes the first filling slot 51. Multiple magnetic barrier layers are arranged between the two outer filling layers along the q-axis, and each of the multiple magnetic barrier layers includes one rotor slot 6, and two second filling slots 52 arranged at two ends of the rotor slot 6 respectively. In the same magnetic barrier layer, separating ribs 8 are arranged between the rotor slot 6 and each of the two second filling slot 52. The maximum width of an outer contour of the second rotor lamination 2 is not greater than the diameter of the outer circle of the first rotor lamination 4, and the maximum q-axial width of the inner hole of the second rotor lamination 2 is not less than the maximum d-axial width thereof. Lengths of at least two lines among the lines connecting the center of the rotor core and any points located at different positions on the edge of the inner hole of the second rotor lamination 2 respectively, are unequal. The second rotor lamination 2 is arranged between the end ring 3 and the first rotor lamination 4, and through slots 21 are formed in the second rotor lamination 2 at positions corresponding to the filling slots of the first rotor lamination 4 respectively, and a total cross-sectional area of first portions of the rotor slots 6 on the first rotor lamination 4, which are located between the edge of the inner hole and the outer circle of the second rotor lamination 2, is less than a total cross-sectional area of the rotor slots 6 on the first rotor lamination 4. As a part of the rotor, the second rotor lamination 2 has an outer contour not larger than the outer circle of the first rotor lamination 4, thus forming an air gap with a certain width between the second rotor lamination 2 and a stator. A q-axis direction of the inner contour of the second rotor lamination 2 corresponds to the direction along which the rotor slots 6 of the first rotor lamination 4 are arranged, and the q-axial width of the inner contour is not less than the d-axial width thereof, such that the rotor slots 6 with a sufficient cross-sectional area are in a direct contact with the air, thus forming a circulation hole and increasing the heat dissipation of the rotor. The lengths of at least two lines, among the lines connecting the center of the rotor core and any points located at different positions on the edge of the inner hole of the second rotor lamination 2 respectively, are unequal, such that a length of the line connecting the center of the rotor and any point, which is located on the edge of the inner hole of the second rotor lamination 2 and located on the q-axis, may be longer, and that more portions of the rotor slots 6 are not blocked by the second rotor lamination 2. The total cross-sectional area of the first portions of the rotor slots 6 on the first rotor lamination 4, which are located between the edge of the inner hole of the second rotor lamination 2 and the outer circle thereof, is less than the total cross-sectional area of the rotor slots 6 on the first rotor lamination 4, that is, the second rotor lamination 2 cannot cover all portions of the rotor slots 6. The structural design of the second rotor lamination 2 can ensure that at least part of the rotor slots 6 can be in a direct contact the air to form a circulation hole, thereby increasing the heat dissipation of the rotor. FIG. 8 is a diagram showing comparisons between temperature rises, losses and efficiencies of the motor using a technical solution of the present invention and a motor in the prior art, as shown in FIG. 8, the temperature rise of the motor using the technical solution of the present invention is low, which may further reduce the copper loss and the aluminum loss and improve the efficiency of the motor.

In some embodiments, the total cross-sectional area of second portions of the rotor slots 6 on the first rotor lamination 4, which are located within the inner hole of the second rotor lamination 2, is at least 30% of the total cross-sectional area of the rotor slots 6. In some embodiments, the ratio is from 45% to 65%. The total cross-sectional area of the second portions of the rotor slots 6 located within the inner hole of the second rotor lamination 2 is limited, so that the rotor slots 6 with a sufficient area are in a direct contact with the air, thereby further improving the heat dissipation of the rotor.

In some embodiments, the ratio of the maximum q-axial width of the inner hole of the second rotor lamination 2 to the maximum d-axial width thereof is from 1 to 1.5, thereby further ensuring that the rotor slots 6 with the sufficient area are in a direct contact with the air.

In some embodiments, a rotation-axial thickness of the second rotor lamination 2 along a laminating direction of the first rotor lamination 4 is not less than a thickness of the single-piece first rotor lamination 4 to ensure the mechanical strength of the rotor.

In some embodiments, the through slots 21 are arranged on the second rotor lamination 2, and the total cross-sectional area of the through slots 21 on the second rotor lamination 2 is not greater than the total cross-sectional area of the filling slots arranged on the first rotor lamination 4. The through slots 21 on the second rotor lamination 2 each are an entrance through which filling materials fill the filling slots on the first rotor lamination 4. The through slots 21 are disposed on the second rotor lamination 2, enabling the filling materials to enter the filling slots on the first rotor lamination 4. By ensuring that the total cross-sectional area of the through slots 21 on the second rotor lamination 2 is not greater than the total cross-sectional area of the filling slots disposed on the first rotor lamination 4, a pressure-bearing area of a non-filling-slot portion of the first rotor lamination 4 may be reduced during a filling process of the materials, thereby ensuring the mechanical strength of the first rotor lamination 4 during the filling process and reducing deformations.

In some embodiments, the positions of the through slot 21 arranged on the second rotor lamination 2 and positions of the filling slots arranged on the first rotor lamination 4 correspond to each other. At the same position, a cross-sectional area of a single through slot 21 on the second rotor lamination 2 is not greater than a cross-sectional area of a single filling slot on the first rotor lamination 4, so as to reduce a local deformation of the first rotor lamination 4 during the filling process of the materials.

In some embodiments, a d-axial width between the inner hole of the second rotor lamination 2 and each of the through slots 21 is greater than the width of a separating rib 8 between a corresponding second filling slot 52 and a corresponding rotor slot 6, thus ensuring that the rotor slots 6 will not be filled with material during a manufacture of the rotor.

In some embodiments, radial widths at different positions, each of which is between the edge of the inner hole and the outer circle of the second rotor lamination 2 (i.e., distances each between two points, where a line connecting the rotor center and the rotor outer circle intersects the edge of the inner hole and the outer circle of the second rotor lamination 2), are unequal, and the radial width kd1 of the second rotor lamination 2 on the d-axis and the radial width kq1 of the second rotor lamination 2 on the q-axis satisfy $1.1 \le kd1/kq1 \le 2.8$. In some embodiments, $1.2 \le kd1/kq1 \le 1.8$, thereby ensuring that sufficient portions of the rotor slots 6 on the first rotor lamination 4 are located within the inner hole of the second rotor lamination 2.

In some embodiments, the total cross-sectional area of the second portions of the rotor slots 6 on the first rotor lamination 4 located within the inner hole of the second rotor lamination 2 is at least 20% of a total circulation area of the motor (including a stator circulation area and a rotor circulation area). In an embodiment, the ratio is from 25% to 40%, to ensure that the rotor slots 6 with a sufficient area are in a direct contact with the air, thus forming the circulation hole and increasing the heat dissipation of the rotor.

In some embodiments, along the q-axis and from a shaft hole 7 of the rotor to the rotor outer circle, cross-sectional areas of the second portions of the rotor slots 6 in the magnetic barrier layers on the first rotor lamination 4 within the inner hole of the second rotor lamination 2 progressively decrease. A portion of the end ring 3, which is located at the outermost magnetic barrier layer close to the rotor outer circle along the q-axis, has a q-axial thickness, thereby ensuring that the end ring 3 has a certain volume to improve the starting capability of the motor.

In some embodiments, the maximum width of the outer contour of the end ring 3 is not greater than the maximum width of the outer contour of the second rotor lamination 2, and the maximum distance from the center of the rotor core to an end face of the end ring 3 is not less than the maximum distance from the center of the rotor core to an end face of the second rotor lamination 2. The maximum width of the outer contour of the end ring 3 is not greater than the maximum width of the outer contour of the second rotor lamination 2, so as to ensure the pressure exerted on the portion of the first rotor lamination 4, which is proximate to the rotor outer circle and not covered by the second rotor lamination 2, during a process of filling the materials, thereby reducing a local deformation. The maximum distance from the center of the first rotor lamination 4 to the end face of the end ring 3 is not less than the maximum distance from the center of the first rotor lamination 4 to the end face of the second rotor lamination 2, thereby ensuring that the rotor has the end ring 3 with a certain volume and improving the starting capability of the motor.

In some embodiments, the d-axial radial width between the edge of the inner hole and the outer circle of the end ring 3 is k9, and the q-axial radial width therebetween is k10, then it is satisfied that $1.1 \le k9/k10 \le 2.8$. In some embodiments, $1.2 \le k9/k10 \le 1.8$. The filling slot of the inner layer adjacent to the shaft hole 7 has a relatively large d-axial width, and in order to cause the filling slot to short itself, the d-axial radial width of the end ring 3 is relatively large. In order to ensure the rotor slots 6 to be in a direct contact with the air, the d-axial radial width of the end ring 3 cannot be too large.

In some embodiments, in each magnetic barrier layer including the second filling slots 52 and the rotor slot 6, separating ribs 8 each are arranged between the rotor slot 6 and each of the second filling slots 52. An axial plane, where a side of each separating rib 8 adjacent to the rotor outer circle is located, has a center point. L denotes a d-axial distance between two center points corresponding to two separating ribs 8 in any two adjacent magnetic barrier layers, and W denotes the maximum q-axial dimension of a magnetic channel formed between the filling slots in the two adjacent magnetic barrier layers, then L should satisfy $0 \le L < 2W$. In some embodiment, $0 \le L < W$. In some embodiments, $0 \le L \le 0.8W$. The minimum distance between the filling slots of the rotor is limited, such that on the one hand, the saturation of the magnetic channel between the filling slots is reduced, and on the other hand, the relative positions of the magnetic channel and the stator teeth are staggered, which has beneficial effects of reducing motor harmonics, reducing torque ripples, reducing harmonic losses, and improving the efficiency and the operational stability of the motor.

It should be noted that, the aforementioned center point is the geometric center point of the rotation-axial plane, where the side of the separating rib 8 adjacent to the rotor outer circle is located. As a specific embodiment, as shown in FIG. 2, the aforementioned plane is a parallelogram plane extending along the rotation-axis direction of the first rotor lamination 4. The geometric center point of the parallelogram plane is also the intersection of the diagonals of the parallelogram plane. The intersection is projected along the rotation-axis direction of the first rotor lamination 4 to obtain a point, namely the midpoint of the side of the separating rib 8 adjacent to the rotor outer circle.

In some embodiments, a width of the air gap formed between an inner wall of an inner circle of the stator and the rotor outer circle is $\sigma$, and L should satisfy $0 < L < 8\sigma$. In some embodiments, $0 \le L \le 6\sigma$. The separating rib 8 may enhance the mechanical strength of the rotor, reduce the deformation of the rotor during a manufacture, and reduce the process difficulty. The relative distance between the separating ribs 8, each of which is formed between the rotor slot 6 and a filling slot of the rotor, is limited, thereby increasing a pressure-bearing area between two adjacent magnetic barrier layers, forming an effect of supporting mutually, reducing the deformation of the rotor during the manufacture, and reducing the process difficulty.

In some embodiments, L1 denotes a d-axial width of the separating rib 8 in the outermost magnetic barrier layer, which is proximate to the rotor outer circle along the q-axis, and L2 denotes a d-axial width of the separating rib 8 in the innermost magnetic barrier layer adjacent to the shaft hole 7, and L1 is not less than L2, and $L1 \ge 0.5\sigma$, where $\sigma$ denotes the width of the air gap between the stator and the rotor. The minimum width of the separating rib 8 is limited, such that the process difficulty may be reduced and the mechanical strength of the rotor is improved. $L1 \ge L2$, which may reduce the magnetic flux leakage of the inner magnetic barrier layer and improve the efficiency of the motor.

In some embodiments, a plane, where the side of the separating rib 8 is located, is parallel to or intersects with a plane, which extends along the rotation-axis direction of the rotor and in which the q-axis is located. That is, the shape of the separating rib 8 is not limited to a rectangle, a trapezoid, or an arc, and may be flexibly designed according to the directions of the magnetic flux leakage lines, thus reducing the magnetic flux leakage of the motor.

In some embodiments, in a first quadrant formed by the d-axis and the q-axis, the distances from the center of the separating rib 8 to the d-axis and to the q-axis satisfy $kq = -\nu \times kd + \lambda$, where kq denotes the distance from the center of the separating rib 8 to the q-axis, and kd denotes the distance from the center of the separating rib 8 to the d-axis, and $\nu$ is dimensionless and satisfies $0.28 \leq \nu \leq 0.46$, and the coefficient $\lambda$ (whose dimension is consistent with those of kq and kd) satisfies $28 \leq \lambda \leq 33$, such that the position and the width of the separating rib 8 are limited, thereby further reducing the risk of a deformation of the rotor.

In some embodiments, in the direction from the shaft hole 7 to the rotor outer circle along the q-axis, the q-axial widths of the rotor slots 6 of at least three layers decrease continuously, a ratio of a sum ($d1+\Sigma d2$) of q-axial widths of all rotor slots 6 and the first filling slot 51 to a width d3 from the edge of the shaft hole 7 to the rotor outer circle is in a range from 0.2 to 0.5, that is, it is satisfied that $(d1+\Sigma d2)/d3=0.2$ to 0.5. In some embodiments, the ratio is in a range from 0.3 to 0.4. Where, d1 denotes the q-axial width of the first filling slot 51, d2 denotes the q-axial width of each rotor slot 6. A reasonable proportion of the magnetic barrier layers is selected, which not only ensures a sufficient magnetic barrier layer width, but also ensures a reasonable magnetic flux channel, thus preventing oversaturation of the magnetic channel while increasing the salient pole ratio of the motor.

In some embodiments, the minimum width W1 of the magnetic channel between two adjacent filling slots should satisfy $W1 \geq d$, where d denotes the minimum width of the magnetic channel formed between rotor slots 6 located in the two magnetic barrier layers respectively. In some embodiments, $W1/d>1.15$, to ensure a sufficient width between the filling slots, thus avoiding a magnetic field saturation which may affect the magnetic flux in the magnetic channel between the magnetic barrier layers.

In some embodiments, the minimum q-axial dimension h1 of the magnetic channel between two adjacent magnetic barrier layers should satisfy $h1 \geq 1.5h2$, where h2 denotes the minimum q-axial width of one magnetic barrier layer having a relatively small q-axial width among the two adjacent magnetic barrier layers. Such an arrangement may reduce the process difficulty of the rotor, and ensure the uniformity and unsaturation of the magnetic density distribution of the rotor.

In some embodiments, the magnetic channels each are formed between two adjacent magnetic barrier layers. In the direction from the shaft hole to the rotor outer circle along the q-axis, the q-axial widths of the magnetic channels decrease progressively. In some embodiments, in the direction from the shaft hole to the rotor outer circle along the q-axis, the q-axial widths of at least three layers of magnetic channels decrease continuously. The closer the magnetic channel is to the shaft hole 7, the greater the effect of the magnetic channel on the stator is, and the greater the impact on the motor performance is. Such an arrangement ensures the width of the magnetic channel adjacent to the shaft hole 7 on the basis of rationally utilizing the space of the rotor, thereby having a beneficial effect of improving the motor performance. The magnetic channel is formed between two adjacent magnetic barrier layers. For the magnetic channel consisting of curved segments and straight segments, in directions from the q-axis to two sides of the q-axis respectively, the widths of the magnetic channel (a width of the magnetic channel is defined as: a shortest distance from any points on one side of the magnetic channel to the other side thereof) progressively increase. The width of the magnetic channel defined herein is a width of a section which the magnetic flux lines of the rotor pass through. Such an arrangement has beneficial effects of reducing the magnetic density saturation of the rotor and reducing the loss of the motor.

In some embodiments, in each magnetic barrier layer, the ratio of a width of the rotor slot 6 at the position of the q-axis to the width of an end of the rotor slot 6 adjacent to a corresponding filling slot is $\tau 1$, and from the innermost magnetic barrier layer to the outermost magnetic barrier layer, the ratios $\tau 1$ progressively increase, which not only ensures the width of each of the magnetic channels between the inner magnetic barrier layers, but also ensures a certain proportion of the magnetic barrier layers, thereby improving the motor performance. In each magnetic barrier layer, a ratio of the maximum q-axial width of each filling slot to the q-axial width of the rotor slot 6 is $\tau 2$, and $\tau 2>1.4$. In some embodiments, $1.5<\tau 2<3.0$. This ratio is limited, such that the filling slots each are ensured to have a certain width to increase an arrangement area thereof. A range of this ratio is limited, which may also ensure the widths of the magnetic channels between the filling slots.

In some embodiments, in the outer magnetic barrier layer, which is close to the rotor outer circle along the q-axis, k3 denotes a d-axial width between ends of the two second filling slots 52, which are proximate to two ends of the rotor slot 6 respectively. In the adjacent inner magnetic barrier layer proximate to the shaft hole 7, K4 denotes a d-axial width between ends of the two second filling slots 52 proximate to two ends of the rotor slot 6 respectively. It is satisfied that $0.5 \leq k3/k4 \leq 1$, or $0.5 \leq k4/k3 \leq 1$. When the space of the rotor is limited, such an arrangement may increase the area of the filling slots and improve the starting capability of the motor.

In some embodiments, in the outermost magnetic barrier layer, which is close to the rotor outer circle along the q-axis, k5 denotes a d-axial width between ends of the two second filling slots 52, which are proximate to two ends of the rotor slot 6 respectively. In an innermost magnetic barrier layer adjacent to the shaft hole 7, k6 denotes a d-axial width between ends of the two second filling slots 52, which are proximate to two ends of the rotor slot 6 respectively. It is satisfied that $0.5 \leq k5/k6 \leq 1$, or $0.5 \leq k6/k5 \leq 1$. When the space of the rotor is limited, such an arrangement may increase the area of the filling slots and improve the starting capability of the motor.

In some embodiments, the first filling slot 51 is arranged on the periphery of the rotor along the q-axis direction, has a segmented structure, and includes a plurality of q-axis filling slots 511. A rib 9 is provided between two adjacent q-axis filling slots 511. The number of ribs 9 in the first filling slot 51 is y, and y satisfies $1 \leq y \leq 4$. The outermost filling layer includes the first filling slot 51 close to the rotor outer circle along the q-axis, and is a portion of the rotor that is most easily deformed. Dividing the first filling slot 51 in the outermost layer into the plurality of q-axis filling slots 511 may reduce the deformation of the rotor at this position.

In some embodiments, the d-axial width of the rib 9 between any two adjacent q-axis filling slots 511 is L3, then L3 should satisfy $L3>0.1M1$, $L3>0.1M2$, and $L3>0.05(M1+M2)$, where M1 and M2 denote the maximum d-axial widths of the any two adjacent q-axis filling slots 511, respectively. The maximum d-axial widths of the q-axis filling slots 511 are limited, such that the saturation degree of the channel between the outermost filling layer and the outer magnetic barrier layer of the rotor may be reduced, thereby reducing motor harmonics, torque ripples, and harmonic losses, and improving the efficiency and the operational stability of the motor. Moreover, the width of each rib 9 between the q-axis filling slots 511 is also limited, which can ensure the pressure-bearing area of the outermost filling layer of the rotor, further enhance the mechanical strength of the rotor, reduce the deformation of the rotor during the manufacture, and reduce the process difficulty.

In some embodiments, a sum of the d-axial widths of the ribs 9 each located between two adjacent q-axis filling slots 511 is $\Sigma L3$ (values of all $L3$ are equal or unequal), then $\Sigma L3 > 0.1\Sigma(M1+M2)$, where $\Sigma(M1+M2)$ denotes a sum of the maximum q-axial widths of the two adjacent q-axis filling slots 511. Such an arrangement can ensure the mechanical strength of the rotor in some embodiments.

In some embodiments, a difference between widths of the ribs 9 is within ±20%, and the minimum value $L3$ of the widths of the ribs 9 should satisfy $L3 \geq \sigma$, where $\sigma$ denotes the width of the air gap between the inner wall of the inner circle of the stator and the rotor outer circle, such that the local deformation at the outermost filling layer of the rotor can be reduced.

In some embodiments, the d-axial widths of different portions of the same rib 9 may be equal or unequal, that is, the shape of the rib 9 is not limited to a rectangle, a trapezoid, or an arc. For the same rib 9, a portion thereof having a relatively high risk of a local deformation may be configured to have a relatively large d-axial width, and another portion thereof having a relatively low risk of a local deformation may be configured to have a relatively small d-axial width.

In some embodiments, a difference between the cross-sectional areas of the q-axis filling slots 511 is within ±30%. In some embodiments, the difference between the cross-sectional areas of the q-axis filling slots 511 is within ±15%. Such arrangements ensure that the areas of all parts of the outermost filling layer subjected to pressures with little difference, thereby avoiding local deformations.

In some embodiments, the angle formed between straight lines connecting the center of the rotor and two ends of the first filling slot 51 respectively is $\alpha 1$, and $20° \leq \alpha 1 \leq 60°$. In some embodiments, $\alpha 1$ should satisfy $30° \leq \alpha 1 \leq 50°$. In some embodiments, $\alpha 1$ should satisfy $30° \leq \alpha 1 \leq 35°$. In such arrangements, the filling slot forms a magnetic barrier layer, and may be used as a magnetic barrier layer to increase the reluctance torque of the motor, and may also be used as a starting squirrel-cage to improve the starting performance of the motor.

In some embodiments, the filling slots include the first filling slots 51 and the second filling slots 52. An extending direction of each of the filling slots is approximately parallel to the d-axis with an angle deviation of no more than 5%, so as to form a smooth magnetic channel with an adjacent magnetic barrier layer thereof.

In some embodiments, the d-axial width of the first filling slot 51 is smaller than a d-axial width between ends of the two second filling slots 52 in the adjacent magnetic barrier layer, where the ends of the two second filling slots 52 each are close to the rotor slot 6. Such an arrangement is to limit the d-axial width of the first filling slot 51, thereby avoiding a deformation of the rotor toward the shaft hole 7 or toward the outer circle due to an excessive width.

In some embodiments, a ratio of a q-axial distance $k12$ from the center of the rotor to the inner wall of the first filling slot 51 to a radius $Rr$ of the rotor satisfies $0.82 \leq k12/Rr \leq 0.96$. If $k12/Rr$ is too small, the outermost-layer magnetic channel is too narrow, the motor loss increases, and the efficiency decreases. If $k12/Rr$ is too large, the distance between the first filling slot 51 and the rotor outer circle is too small, causing the processing to be more difficult. A ratio of the q-axial distance between respective sides, proximate to a shaft hole 7, of the two innermost magnetic barrier layers adjacent to the shaft hole 7, to a q-axial width of the rotation shaft is greater than 1.2, which, on the one hand, may ensure the width of the magnetic channel between the innermost magnetic barrier layer and the rotation shaft, and reduce the magnetic density saturation of the rotor, and on the other hand, may enhance the mechanical strength of the portion of the rotor adjacent to the rotation shaft. A ratio of the diameter of the curved segment of the side, proximate to the shaft hole 7, of the innermost magnetic barrier layer adjacent to the shaft hole 7 to the q-axial width of the rotation shaft is greater than 2, so as to reasonably utilize the space of the rotor for the arrangement of the magnetic barrier layer.

In some embodiments, the maximum q-axial thickness of the first filling slot 51 is k, and the maximum q-axial thickness of the second filling slot 52 in the adjacent magnetic barrier layer of the first filling slot is $k1$, and the minimum q-axial thickness of the magnetic channel connected to the first filling slot is $k2$, then $1 < k/k1 \leq 2$, and $0.8 < k/k2 \leq 1.6$, which not only ensures the q-axial thickness of the first filling slot 51 to reduce the process difficulty, but also ensures the width of the outermost-layer magnetic channel to improve the motor performance.

In some embodiments, a spacing between the rotor outer circle and the filling slot of the innermost magnetic barrier layer which is proximate to the shaft hole 7 along the q-axis is $h3$, and a spacing between the rotor outer circle and the outermost filling layer adjacent to the rotor outer circle is $h4$, then $h4 \geq h3$, and $0 \leq h3 \leq 2.5\sigma$, where $\sigma$ denotes the width of the air gap between the inner wall of the inner circle of the stator and the rotor outer circle. $0 \leq h3 \leq 2.5\sigma$, that is, the filling slot is an open slot or a closed slot. When the filling slot is a closed slot, the maximum spacing between the filling slot and the rotor outer circle is limited, such that magnetic flux leakage is reduced. $h4 \geq h3$, which may reduce the magnetic flux leakage of the inner magnetic barrier layer while ensuring the mechanical strength of the outer magnetic barrier layer.

In some embodiments, the maximum q-axial width of an end portion of each filling slot adjacent to the rotor outer circle is not greater than the maximum q-axial width of a region of the filling slot adjacent to the q-axis of the rotor. In some embodiments, the q-axial widths of each filling slot from the rotor outer circle to the q-axis of the rotor are approximately equal, and a width deviation is not greater than 5%, such that the width, adjacent to the air gap, of the magnetic channel between the magnetic barrier layers of the rotor is ensured, thus reducing the saturation of the rotor. The q-axial widths of the filling slot are approximately equal, which may increase the area of the filling slot while ensuring the width of the magnetic channel adjacent to the air gap, thus achieving beneficial effects of improving starting.

In some embodiments, the motor rotor includes at least five or more filling slots with different cross-sectional areas. A total cross-sectional area of the filling slots (including the first filling slots 51 and the second filling slots 52) is 30% to 70% of a total rotor circulation area (i.e., a sum of cross-sectional areas of the first filling slots 51, of the second filling slots 52, and of the rotor slots 6). In some embodiments, this ratio is from 35% to 50%, such that a certain proportion of the areas of the filling slots is ensured, and that the motor has a certain capability of starting with load.

In some embodiments, a ratio of the maximum q-axial width to the minimum q-axial width of the filling slot is $\tau$, and $1 \leq \tau \leq 2$. In some embodiments, $1.3 \leq \tau \leq 1.5$. By limiting this ratio, on the one hand, the width of the magnetic channel will not be too small due to an excessive q-axial width of the filling slot to affect the efficiency, and on the other hand, the cross-sectional area of the filling slot will not be too small due to a too small q-axial width of the filling slot to affect the starting.

In some embodiments, in the direction from the rotor outer circle to the shaft hole along the q-axis, the d-axial widths of the second filling slots 52 increase progressively. In some embodiments, in the direction from the rotor outer circle to the shaft hole along the q-axis, the maximum d-axial widths of the second filling slots 52 in at least three layers increase continuously. In some embodiments, in the direction from the shaft hole to the rotor outer circle along the q-axis, the maximum d-axial widths of the second filling slots 52, which are disposed in the magnetic barrier layers from the second magnetic barrier layer close to the d-axis to the magnetic barrier layer close to the rotor outer circle, decrease continuously. Such arrangements may ensure amount of cast aluminum with an appropriate cross-sectional area while making reasonable use of rotor space, thereby improving the starting capability of the motor.

In some embodiments, the filling slots include the first filling slot 51 and the second filling slot 52, and at least part of the filling slots are filled with conductive but non-magnetic material, and the filling slots are self-short-circuited through the end rings 3 arranged at two ends of the second rotor lamination to form a squirrel-cage structure. A material of each end ring 3 is the same as the material filled in the filling slots. The self-short-circuited squirrel-cage structure provides asynchronous torque at the starting stage, thereby achieving the self-starting of the motor. The multiple magnetic barrier layers provide the magnetic resistance torque for the motor to achieve a synchronous operation of the motor.

In some embodiments, each rotor slot 6 includes a curved segment and/or a straight segment, and curvature radii of the curved segments of the rotor slots 6 become larger progressively in the direction from the shaft hole 7 to the rotor outer circle. In the same layer, the curvature radius of an outer arc of the rotor slot 6 is greater than the curvature radius of an inner arc of the rotor slot, and the curved segment protrudes in the direction from the shaft hole 7 towards the rotor outer circle. Or, two ends of a rotor slot 6 extend in the d-axis direction to form straight segments respectively. Two ends of each of or part of the rotor slots 6 are parallel to the d-axis, and the widths of each rotor slot 6 progressively increase from the middle (located on the q-axis) of the rotor slot 6 toward two ends thereof (i.e., along the d-axis direction). The shaft hole 7 is formed in the middle of the rotor. Such arrangements may increase the space utilization of the rotor and allow the rotor slots 6 to be rationally arranged, thus increasing a salient pole ratio of the rotor and improving the reluctance torque of the motor.

In some embodiments, from the shaft hole 7 to the rotor outer circle, lengths of curves, each of which is connected between ends of each rotor slot 6 adjacent to two second filling slots 52 in each layer, decrease progressively, and the lengths of the curves of adjacent rotor slots 6 decrease by a ratio from 5% to 25%. The shaft hole 7 is formed in the middle of the rotor. The purpose of such arrangements is to ensure a certain proportion of magnetic barrier layers while rationally utilizing space of the rotor, thereby improving the motor performance.

In some embodiments, the maximum q-axial width of the shaft hole 7 is not greater than the maximum d-axial width of the shaft hole 7. The rotor slots 6 are arranged in the q-axis direction. Such an arrangement may increase the utilization rate of the rotor space, so as to reasonably arrange the rotor slots 6, increase the rotor salient pole ratio, and improve the motor reluctance torque.

In some embodiments, the cross-sectional shape of the shaft hole 7 is composed of arc segments and/or straight segments, that is, the shape of the shaft hole 7 is not limited to a circle, an ellipse, a quasi-ellipse, or a quadrilateral, and the shape of the shaft hole 7 may be flexibly selected according to the arrangement of the rotor slots 6.

The end rings 3 at two ends of the rotor are equipped with balancing blocks, which are placed on a side of the end ring 3 with a relatively large radial width, which is between the inner hole edge and the outer circle of the end ring 3.

The present invention provides a motor rotor of a self-starting synchronous reluctance motor, which realizes a self-starting of the motor through an asynchronous torque provided by a rotor guide bar (a component formed by the filling slots after being filled), solves the problem that the synchronous reluctance motor needs to be driven by a frequency converter, reduces the loss of the motor, and improves the efficiency of the motor. The motor rotor can reduce the harmonics of the motor, reduce the torque ripples, reduce the harmonic losses, improve the efficiency and operating stability of the motor, and can increase the air circulation area of the rotor, thereby accelerating the heat dissipation of the rotor.

It should be understood that the length, width, thickness, diameter, etc. of related structures of the rotor core in the present invention may preferably be measured in millimeter, and under reasonable circumstances, other suitable measurement units may also be adopted.

According to an embodiment of the present invention, a self-starting synchronous reluctance motor is also provided, especially a self-starting synchronous reluctance two-pole motor including the motor rotor above. The inertia of the load connected to the output end of the motor shaft is smaller than 60% of the inertia of the rotation shaft system of the motor.

According to an embodiment of the present invention, a compressor is also provided, and includes the self-starting synchronous reluctance motor above.

It should be understood for those skilled in the art that the above embodiments can be freely combined and superimposed if no conflicts occur.

What described above are only some embodiments of the present invention but not intended to limit the present invention. Any modifications, equivalent substitutions and improvements made within the spirit and principles of the present invention shall be included in the protection scope of the present invention. What described above are some embodiments of the present invention. It should be noted that, for the ordinary skilled in the art, various improvements and modifications may be made without departing from the technical principles of the present invention, and these improvements and modification should also be regarded as the protection scope of the present invention.

What is claimed is:

1. A motor rotor, comprising a rotor core, wherein the rotor core comprises:

a first rotor lamination, wherein filling slots, rotor slots, and a shaft hole are formed in the first rotor lamination; the filling slots comprise first filling slots and second filling slots; two outer filling layers are respectively arranged on the first rotor lamination and proximate to a rotor outer circle along a q-axis, and each of the two outer filling layers comprises one first filling slot; multiple magnetic barrier layers are arranged between the two outer filling layers along the q-axis at intervals, and each of the multiple magnetic barrier layers comprises one rotor slot, and two second filling slots arranged at two ends of the rotor slot, respectively; in the same magnetic barrier layer, separating ribs are arranged between the rotor slot and each of the two second filling slots;

an end ring; and a second rotor lamination arranged between the end ring and the first rotor lamination, wherein through slots are formed in the second rotor lamination at positions corresponding to the filling slots of the first rotor lamination respectively, and a total cross-sectional area of first portions of the rotor slots on the first rotor lamination between an edge of an inner hole and an outer circle of the second rotor lamination is less than a total cross-sectional area of the rotor slots on the first rotor lamination;

wherein the maximum q-axial thickness of each of the first filling slots is k, and the maximum q-axial thickness of the second filling slot in an adjacent magnetic barrier layer of the first filling slot is k1, and the minimum q-axial thickness of a magnetic channel connected to the each of the first filling slot is k2, and it is satisfied that $1<k/k1\leq 2$, and $0.8<k/k2\leq 1.6$.

2. The motor rotor according to claim 1, limited by at least one of limitations that:

a total cross-sectional area of second portions of the rotor slots on the first rotor lamination within the inner hole of the second rotor lamination is at least 30% of the total cross-sectional area of the rotor slots;

the maximum width of an outer contour of the second rotor lamination is not greater than a diameter of an outer circle of the first rotor lamination; and the maximum q-axial width of the inner hole of the second rotor lamination is not less than the maximum d-axial width thereof.

3. The motor rotor according to claim 1, wherein lengths of at least two lines, among lines connecting a center of the rotor core and any points located at different positions on the edge of the inner hole of the second rotor lamination, are unequal.

4. The motor rotor according to claim 1, limited by at least one of limitations that:

a ratio of the maximum q-axial width of the inner hole of the second rotor lamination to the maximum d-axial width thereof is from 1 to 1.5; and a rotation-axial thickness of the second rotor lamination is not less than a thickness of a single-piece first rotor lamination.

5. The motor rotor according to claim 1, limited by at least one of limitations that:

a total cross-sectional area of the through slots on the second rotor lamination is not greater than a total cross-sectional area of the filling slots arranged on the first rotor lamination; and at the same position, a cross-sectional area of a single through slot on the second rotor lamination is not greater than a cross-sectional area of a single filling slot on the first rotor lamination.

6. The motor rotor according to claim 1, limited by at least one of limitations that:

a d-axial width between the inner hole of the second rotor lamination and each of the through slots is greater than a width of a corresponding separating rib between a corresponding second filling slot and a corresponding rotor slot; and radial widths at different positions, each of which is between the edge of the inner hole and the outer circle of the second rotor lamination, are unequal, and a radial width kd1 of the second rotor lamination on a d-axis and a radial width kq1 of the second rotor lamination on the q-axis satisfy $1.1\leq kd1/kq1\leq 2.8$.

7. The motor rotor according to claim 1, wherein, in a first quadrant formed by a d-axis and the q-axis, a distance from a center of a separating rib to the d-axis and a distance from the center of the separating rib to the q-axis satisfy $kq=-v\times kd+\lambda$, wherein: kq denotes the distance from the center of the separating rib to the q-axis, and kd denotes the distance from the center of the separating rib to the d-axis, and it is satisfied that $0.28\leq v\leq 0.46$, and $28\leq\lambda\leq 33$.

8. The motor rotor according to claim 1, limited by at least one of limitations that:

in each magnetic barrier layer, a ratio of a width of the rotor slot at a position of the q-axis to a width of an end of the rotor slot adjacent to a corresponding filling slot is $\tau 1$, and from the innermost magnetic barrier layer to the outermost magnetic barrier layer, the ratios $\tau 1$ progressively increase; and in each magnetic barrier layer, a ratio of the maximum q-axial width of each filling slot to a q-axial width of the rotor slot is $\tau 2$, and $\tau 2>1.4$.

9. The motor rotor according to claim 1, wherein each of the first filling slots is arranged on a periphery of the rotor along the q-axis direction, has a segmented structure, and comprises a plurality of q-axis filling slots; and a rib is provided between two adjacent q-axis filling slots.

10. The motor rotor according to claim 9, limited by at least one of limitations that:

the number of ribs in each of the first filling slots is y, and y satisfies $1\leq y\leq 4$; and a d-axial width of the rib between any two adjacent q-axis filling slots is L3, and it is satisfied that $L3>0.1M1$, $L3>0.1M2$, and $L3>0.05\ (M1+M2)$, wherein M1 and M2 denote maximum d-axial widths of any two adjacent q-axis filling slots, respectively.

11. The motor rotor according to claim 1, wherein a d-axial width of each of the first filling slots is smaller than a d-axial width between ends of the two second filling slots in an adjacent magnetic barrier layer thereof, wherein the ends of the two second filling slots each are close to the rotor slot.

12. The motor rotor according to claim 1, wherein the maximum q-axial width of an end portion of each of the filling slots adjacent to the rotor outer circle is not greater than the maximum q-axial width of a region of the each of the filling slots adjacent to the q-axis of the rotor.

13. The motor rotor according to claim 1, limited by at least one of limitations that:

among the filling slots on the first rotor lamination, at least five or more of the filling slots have different cross-sectional areas; and a total cross-sectional area of the first filling slots and of the second filling slots is 30% to 70% of a total cross-sectional area of the first filling slots, of the second filling slots, and of the rotor slots.

14. The motor rotor according to claim 1, wherein a ratio of the maximum q-axial width to the minimum q-axial width of each of the filling slots is $\tau$, and $1\leq\tau\leq 2$.

15. The motor rotor according to claim 1, wherein, in a direction from the rotor outer circle to the shaft hole along the q-axis, d-axial widths of the second filling slots increase progressively.

16. The motor rotor according to claim 1, wherein at least part of the filling slots among the first filling slots and the second filling slots are filled with conductive but non-magnetic material, and the filling slots are self-short-circuited through end rings arranged at two ends of the second rotor lamination respectively to form a squirrel-cage structure.

17. The motor rotor according to claim 1, limited by at least one of limitations that:

in a direction from the shaft hole to the rotor outer circle, lengths of curves, each of which is connected between ends of the rotor slot adjacent to the two second filling slots in each layer, decrease progressively, and the lengths of the curves of adjacent rotor slots decrease by a ratio from 5% to 25%; and the maximum q-axial width of the shaft hole is not greater than the maximum d-axial width of the shaft hole.

18. A self-starting synchronous reluctance motor, comprising a stator and the motor rotor according to claim 1.

19. A compressor, comprising the self-starting synchronous reluctance motor according to claim 18.

* * * * *